United States Patent
Choi et al.

(10) Patent No.: US 11,906,194 B2
(45) Date of Patent: Feb. 20, 2024

(54) AIR VENT ASSEMBLY

(71) Applicants: Hyundai Motor Company, Seoul (KR); Kia Corporation, Seoul (KR)

(72) Inventors: Sung Sik Choi, Suwon-Si (KR); Hong Kil Noh, Asan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 28 days.

(21) Appl. No.: 17/512,388

(22) Filed: Oct. 27, 2021

(65) Prior Publication Data

US 2022/0260275 A1 Aug. 18, 2022

(30) Foreign Application Priority Data

Feb. 15, 2021 (KR) .......................... 10-2021-0019605

(51) Int. Cl.
*F24F 13/08* (2006.01)

(52) U.S. Cl.
CPC .................. *F24F 13/082* (2013.01)

(58) Field of Classification Search
CPC .... F24F 13/15; F24F 13/082; F24F 2013/207; F24F 13/084; F24F 2013/088; B60H 1/3421; B60H 1/3428; B60H 2001/3478; B60H 2001/3471; B60H 1/3414; B60H 1/00871; B60H 2001/3464; B60H 1/24
See application file for complete search history.

(56) References Cited

U.S. PATENT DOCUMENTS

| | | | |
|---|---|---|---|
| 2005/0245189 A1* | 11/2005 | Terai .................... | B60H 1/3414 454/155 |
| 2018/0170152 A1* | 6/2018 | Lee ....................... | B60H 1/3421 |
| 2020/0094656 A1* | 3/2020 | Kim ..................... | B60H 1/3421 |

FOREIGN PATENT DOCUMENTS

KR 2018-0072187 A 6/2018

* cited by examiner

*Primary Examiner* — Edelmira Bosques
*Assistant Examiner* — Brett Peterson Mallon
(74) *Attorney, Agent, or Firm* — MORGAN, LEWIS & BOCKIUS LLP

(57) ABSTRACT

An air vent assembly may include a housing to allow air to pass therethrough, a slit assembly disposed inside the housing and controlling a flow direction of the air, and a knob movably connected to the slit assembly to move the slit assembly, wherein the slit assembly includes an upper inlet plate connected to the housing, the upper inlet plate movable along the internal surface of the housing, a lower inlet plate forming an inlet slit from the upper inlet plate and disposed inside the housing, the lower inlet plate connected to the housing and movable along the internal surface of the housing, and an outlet plate, wherein a side of the outlet plate is pivotally coupled to the upper inlet plate and the lower inlet plate to be movable with the upper inlet plate and the lower inlet plate and the other side is pivotally coupled in the housing.

19 Claims, 9 Drawing Sheets

AIR VENT ASSEMBLY

CROSS REFERENCE TO RELATED APPLICATION

The present application claims priority to Korean Patent Application No. 10-2021-0019605, filed Feb. 15, 2021, the entire contents of which is incorporated herein for all purposes by this reference.

BACKGROUND OF THE INVENTION

Field of the Invention

The present invention relates to an air vent assembly. More particularly, the present disclosure relates to an air vent assembly of a vehicle, the assembly being configured to improve control of a wind direction and also to have a slim shape.

Description of Related Art

A vehicle has an air conditioner that conditions air in a vehicle compartment to be in a pleasant state for a driver and a passenger. The air conditioned by the air conditioner flows through an air duct and is supplied to the vehicle compartment by passing through an air vent provided in the vehicle compartment. Typically, an air vent is mounted in a center fascia panel, a crash pad, and so on of a vehicle, and the air vent allows a driver and a passenger to adjust a direction of a discharged wind.

Among air vents invented to adjust a direction of a discharged wind, there is a wing-type air vent having a plurality of horizontal wings and a plurality of vertical wings. The wing-type air vent includes wings for adjusting a wind direction in left and right directions and up and down directions. Since the wing-type air vent requires a space to mount the plurality of wings, a large space for installation is taken up in the center fascia panel or the crash pad. Also, design freedom allowed at a front portion of a vehicle compartment is lowered in relation to an instrument panel and an Audio, Video, Navigation (AVN) system disposed around the air vent.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air vent assembly for a vehicle, the assembly having a slim shape with a small size in a vertical direction. At the same time, various aspects of the present invention are directed to providing an air vent assembly that is configured to improve control of a wind direction.

Furthermore, various aspects of the present invention are directed to providing an air vent assembly configured to increase the degree of designing freedom in relation to a vehicle interior or a crash pad.

Furthermore, the present invention is to propose an air vent assembly which is configured to embody a crash pad having a slim shape in the vertical direction.

The objectives of the present invention are not limited to those described above and other objectives not stated herein would be understood by those who have ordinary skills in the art that the present invention belongs to from the following description.

To accomplish objectives above and characteristic effects to be described later of the present invention, distinctive structures of the present invention are described as follows.

According to various exemplary embodiments of the present invention, the air vent assembly includes: a housing configured to allow air to pass therethrough; a slit assembly disposed inside the housing and configured to control a flow direction of the air; and a knob movably connected to the slit assembly to move the slit assembly, wherein the slit assembly includes: an upper inlet plate slidably connected to the housing so that the upper inlet plate is movable along an internal surface of the housing; a lower inlet plate forming an inlet slit from the upper inlet plate and disposed inside the housing, wherein the lower inlet plate is slidably connected to the housing and movable along the internal surface of the housing; and an outlet plate, wherein a first side of the outlet plate is pivotally coupled to the upper inlet plate and the lower inlet plate to be movable together with the upper inlet plate and the lower inlet plate and the other side is pivotally coupled in the housing.

According to various exemplary embodiments of the present invention, provided is an air vent assembly in which the size of an air vent is reduced in the vertical direction thereof.

According to various exemplary embodiments of the present invention, provided is an air vent assembly which is configured to improve control of a wind direction without loss of wind speed.

The effects of the present invention are not limited to those described above, and other effects not mentioned will be clearly recognized by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it should be understood that they should not be construed as being limited to the exemplary embodiments described in the exemplary embodiment, but include all of modifications, equivalents, or substitutes included in the spirit and scope of the present invention.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, and/or elements, but do not preclude the presence or addition of one or more other components, steps, operations, and/or elements thereof.

Hereinafter, exemplary embodiments of the present invention will be described in detail with reference to the accompanying drawings.

As illustrated in FIG. 1, FIG. 2, FIG. 3, and FIG. 4, an air vent assembly 1 according to various exemplary embodiments of the present invention includes a housing 100 and a slit assembly 200.

Figure 1:
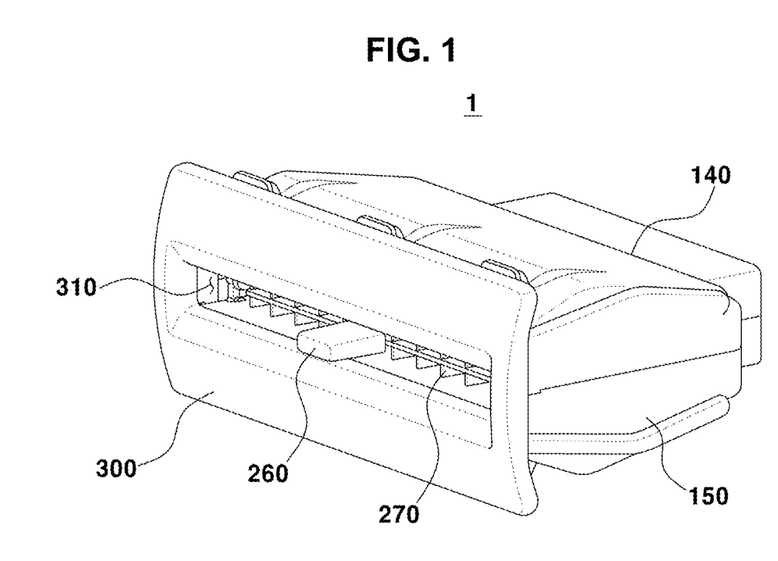
FIG. 1 is a perspective view exemplarily illustrating an air vent assembly according to various exemplary embodiments of the present invention.
Figure 2:
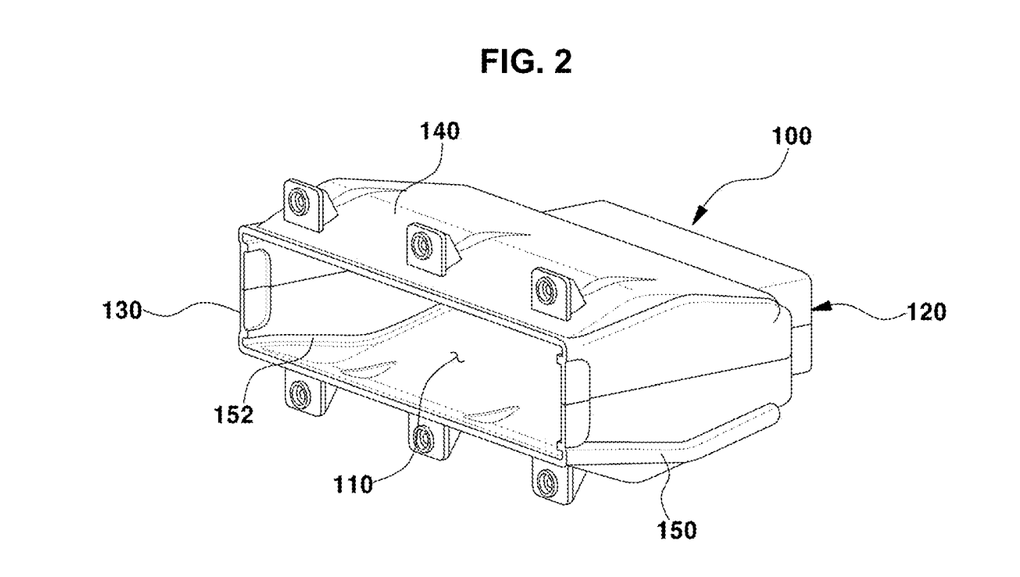
FIG. 2 is a housing of the air vent assembly according to various exemplary embodiments of the present invention.

An accommodation space 110, which is an empty space, is formed within the housing 100. An air inlet 120 is provided at one side of the accommodation space 110, and an air outlet 130 is provided opposite to the air inlet 120 in the accommodation space 110. The air inlet 120 is in fluidical communication with a heating, ventilation, and air conditioning (HVAC) system, so air from the HVAC system is introduced into the housing 100 through the air inlet 120. The air introduced into the housing 100 is supplied to a vehicle compartment through the air outlet 130.

According to various exemplary embodiments of the present invention, the housing 100 includes an upper housing 140 and a lower housing 150. The housing 100 may be a single unit. However, the housing 100 may be separated to an upper housing 140 and a lower housing 150 for convenience in assembly. In the specification, the housing 100 is described as an element where two separate elements, the upper housing 140 and the lower housing 150, are coupled to each other, but the housing 100 may be provided as a single unit.

Tracks 142, 152 are formed in the housing 100. The tracks 142, 152 are formed on internal sides of the housing 100. According to various exemplary embodiments of the present invention, the internal sides of the housing 100 are recessed to form the tracks 142, 152, and the tracks 142, 152 have a predetermined length along the housing 100. According to various exemplary embodiments of the present invention, the tracks 142, 152 protrude from the internal sides of the housing and have a predetermined length along the housing 100.

According to various exemplary embodiments of the present invention, the tracks 142, 152 include an upper tracks 142 disposed at the upper housing 140 and lower tracks 152 disposed at the lower housing 150. The upper tracks 142 and the lower tracks 152 may be substantially symmetrical with respect to a longitudinal centerline of the housing 100 (see also FIG. 7A, etc.). According to various exemplary embodiments of the present invention, two upper tracks 142 are formed, and each upper track 142 may be provided at each internal side of the upper housing 140 and face each other. According to various exemplary embodiments of the present invention, two lower tracks 152 are provided, and each lower track 152 may be provided at each internal side of the lower housing 150 and face each other.

The slit assembly 200 is accommodated in the housing 100. The slit assembly 200 is accommodated within the accommodation space 110 of the housing 100.

Figure 3:
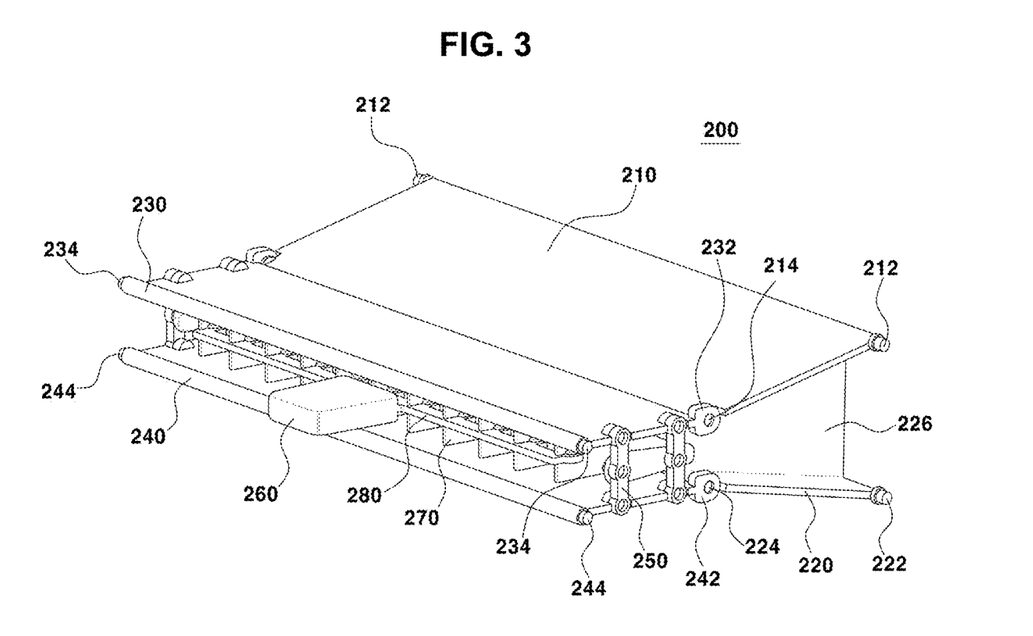
FIG. 3 is a view exemplarily illustrating a slit assembly of the air vent assembly according to various exemplary embodiments of the present invention.

Referring to FIG. 3, according to various exemplary embodiments of the present invention, the slit assembly 200 includes an upper inlet plate 210, a lower inlet plate 220, an upper outlet plate 230, and a lower outlet plate 240.

The upper inlet plate 210 and the lower inlet plate 220 are disposed adjacent to the air inlet 120 within the housing 100. The upper outlet plate 230 and the lower outlet plate 240 are disposed adjacent to the air outlet 130 within the housing 100. The upper inlet plate 210 and the upper outlet plate 230 may be directly connected to each other, while the lower inlet plate 220 and the lower outlet plate 240 may be directly connected to each other.

Figure 8A:
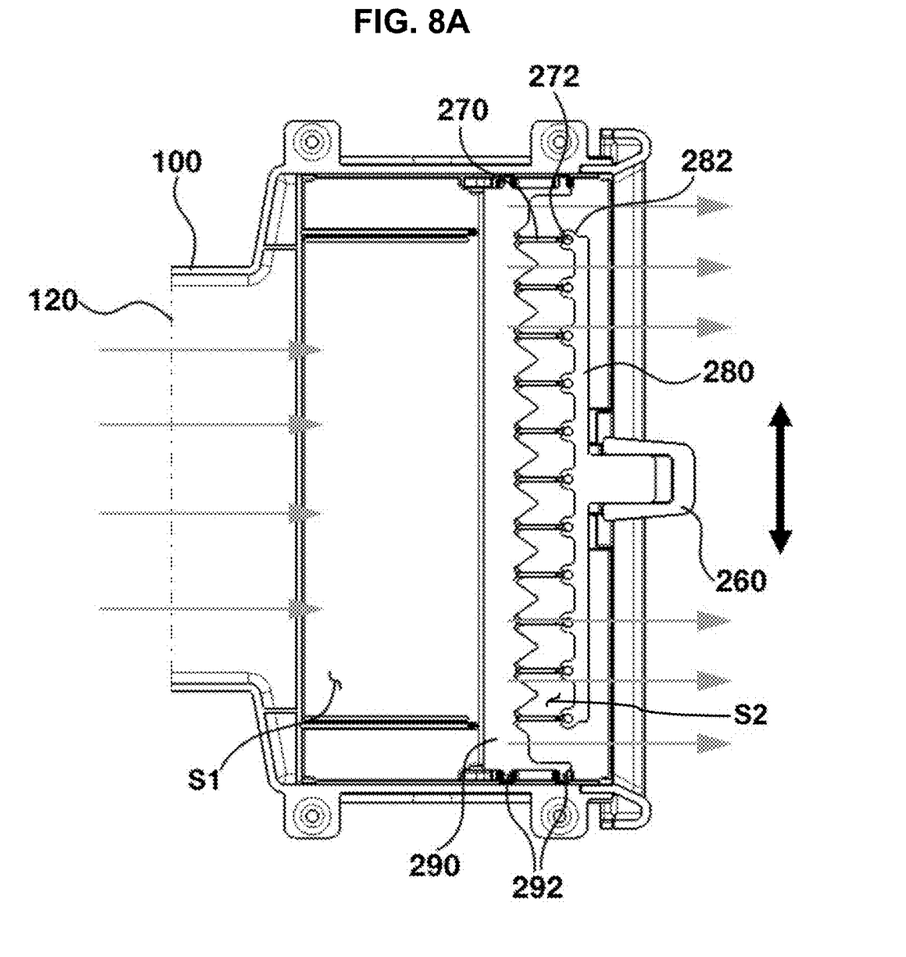
FIG. 8A, FIG. 8B and FIG. 8C are cross-sectional views taken along line B-B' in FIG. 6.

An inlet slit S1 is formed between the upper inlet plate 210 and the lower inlet plate 220 (see also FIG. 8A). In other words, the upper inlet plate 210 and the lower inlet plate 220 are spaced a certain distance apart in the housing 100. The inlet slit S1 is configured to allow air introduced from the air inlet 120 to flow therethrough.

An outlet slit S2 is formed between the upper outlet plate 230 and the lower outlet plate 240. In other words, the upper outlet plate 230 and the lower outlet plate 240 are connected to the housing 100 at a certain distance apart from each other. The outlet slit S2 is in fluidical communication with the inlet slit S1. The air through the inlet slit S1 passes the outlet slit S2 to exit through the air outlet 130.

The upper inlet plate 210 is configured to be slidable along the housing 100 or the upper housing 140. Upper slide points 212 are formed at both sides of the upper inlet plate 210, respectively. Movement of the upper slide points 212 is guided by the upper tracks 142, and the upper slide points 212 are configured to be slidable along the upper tracks 142.

At the upper inlet plate 210, upper movement points 214 are provided at a position spaced from the respective upper slide points 212 by a certain distance. The upper movement points 214 are configured to be movable to up and down directions within the housing 100. The upper movement points 214 are configured to be rotatable in a certain range under a constraint of the respective upper slide points 212.

The lower inlet plate 220 is also configured to be slidable along the housing 100 or the lower housing 150. Lower slide points 222 are formed at both sides of the lower inlet plate 220, respectively. Movement of the lower slide points 222 is guided by the lower tracks 152, and the lower slide points 222 are configured to be slidable along the lower tracks 152.

At the lower inlet plate 220, lower moving points 224 are provided at a position spaced from each lower slide point 222 with a predetermined distance. The lower moving points 224 are formed to be movable in the up and down directions within the housing 100. The lower moving points 224 are configured to be rotatable within a predetermined range under a constraint of the lower slide points 222.

According to various exemplary embodiments of the present invention, both left and right sides of each of the upper inlet plate 210 and the lower inlet plate 220 are substantially closed. To allow all of the air introduced through the air inlet 120 to substantially move through the inlet slit S1, both left and right sides of the upper inlet plate 210 and the lower inlet plate 220 are almost completely closed. To the present end, according to various exemplary embodiments of the present invention, upper partitions 216 that are protruding toward the lower direction or the lower inlet plate 220 are formed at both left and right sides of the upper inlet plate 210. Correspondingly, lower partitions 226 that are protruding toward the upper direction or the upper inlet plate 210 are formed at both left and right sides of the lower inlet plate 220. Each upper partition 216 and lower partition 226 may overlap with each other so that flow of air in a lateral direction of the inlet slit S1 is prevented.

The upper outlet plate 230 is connected to the upper inlet plate 210. The upper outlet plate 230 is connected to the upper movement points 214 of the upper inlet plate 210. Upper connection points 232 may be provided at both sides of the upper outlet plate 230, and the upper movement points 214 may be configured to be connected to the upper connection points 232, respectively.

The other side of the upper outlet plate 230 is connected to the housing 100 or to the upper housing 140. At the upper outlet plate 230, upper pivot points 234 are provided at a position spaced from each upper connection point 232 with a predetermined distance. The upper pivot points 234 are pivotably fastened to the housing 100 or the upper housing 140.

The upper outlet plate 230 may include an upper coupling portion 236 and may include two or more upper coupling portions 236. Each upper coupling portion 236 may be formed between the respective upper connection point 232 and the upper pivot point 234. According to various exemplary embodiments of the present invention, the upper coupling points 236 are formed by protruding outward from each side of the upper outlet plate 230.

The outlet slit S2 is formed between the upper outlet plate 230 and the lower outlet plate 240, and the lower outlet plate 240 is spaced from the upper outlet plate 230 with a predetermined distance. A side of the lower outlet plate 240 is connected to the lower inlet plate 220. According to various exemplary embodiments of the present invention, lower connection points 242 are provided at both sides of the lower outlet plate 240, and the lower connection points 242 are connected to the lower moving points 224.

At the lower outlet plate 240, lower pivot points 244 are provided at a position spaced from the lower connection points 242 with a predetermined distance. The lower outlet plate 240 may be rotatably fastened to the housing 100 by the lower pivot point 244.

The lower outlet plate 240 may include lower coupling portions 246. Each lower coupling portion 246 may be formed between the respective lower connection point 242 and lower pivot point 244, and may be formed by protruding outwardly from the lower outlet plate 240 similar to the upper coupling portion 236. Furthermore, each upper coupling portion 236 and lower coupling portion 246 may be provided positioned symmetrical with respect to a longitudinal centerline of the slit assembly 200.

Figure 4:
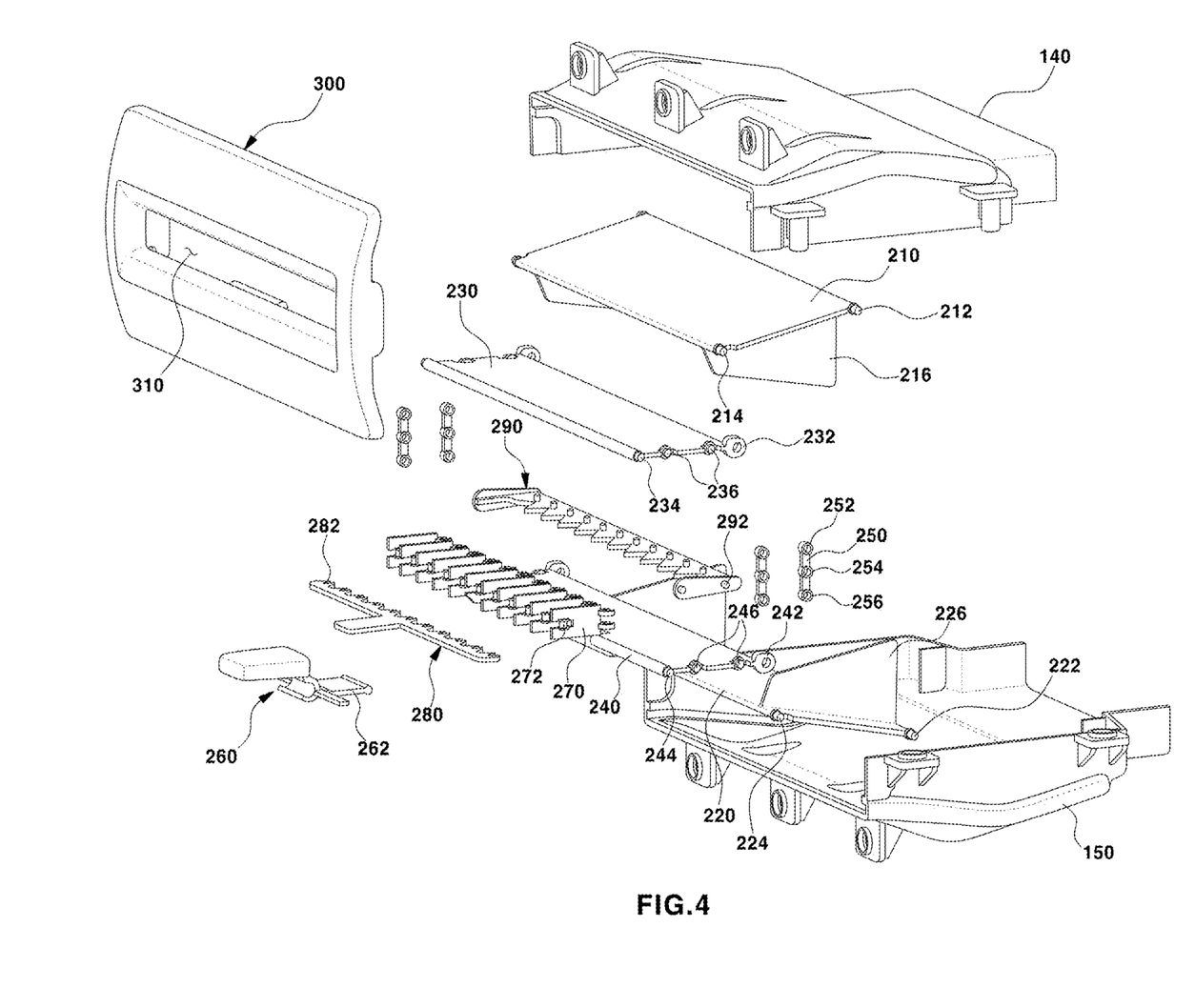
FIG. 4 is an exploded perspective view exemplarily illustrating the air vent assembly according to various exemplary embodiments of the present invention.

The upper outlet plate 230 and the lower outlet plate 240 are connected to each other. In other words, when any one of the upper outlet plate 230 and the lower outlet plate 240 rotates with respect to the upper pivot points 234 or the lower pivot points 244, the other one of the upper outlet plate 230 and the lower outlet plate 240 also rotates correspondingly. To the present end, according to various exemplary embodiments of the present invention, the upper outlet plate 230 and the lower outlet plate 240 are connected to each other by a connection link 250. One or more connection links 250 may connect the upper outlet plate 230 and the lower outlet plate 240. According to various exemplary embodiments of the present invention, the connection link 250 includes a plurality of holes 252, 254, 256. As a non-limiting example, the connection link 250 may include an upper hole 252, a middle hole 254, and a lower hole 256. The upper coupling portion 236 may be inserted into the upper hole 252 of the connection link 250, and the lower coupling portion 246 is inserted into the lower hole 256 of the connection link 250 so that the upper outlet plate 230 and the lower outlet plate 240 is connected to each other.

The knob 260 enables the direction of air discharged to be changed from the outside of the air vent assembly 1. To the present end, the knob 260 is configured to be moved to the up and down directions or the left and right directions. For example, the knob 260 may be slidably coupled to any one of the upper outlet plate 230 and the lower outlet plate 240. As a non-limiting example, the knob 260 may include a knob sliding portion 262. For example, as shown in the drawings, when the knob sliding portion 262 of the knob 260 is coupled to the lower outlet plate 240, the knob sliding portion 262 may be configured to be moved to the left and right directions with a predetermined distance with respect to the lower outlet plate 240. In the instant case, the lower outlet plate 240 may include an accommodation portion R which is a place where the knob sliding portion 262 is slidably mounted. Furthermore, for example, the knob 260 is mounted to be rotatable and slidable to the left and right directions with respect to a bezel 300 that will be described later. To the present end, the knob 260 includes a knob pivot portion 264 which is rotatably coupled to the bezel 300.

Furthermore, the slit assembly 200 is moved or rotated by the up and down directions movement of the knob 260. For example, the knob 260 allows the slit assembly 200 to be moved or rotated by vanes 270 that will be described later. As various exemplary embodiments of the present invention, as illustrated in the drawings, when the knob 260 is coupled to the lower outlet plate 240, the lower outlet plate 240 coupled to the knob 260 is also rotated by the up and down directions movement of the knob 260. When the lower outlet plate 240 is rotated, the lower inlet plate 220 connected to the lower outlet plate 240 is moved, and also the upper outlet plate 230 connected to the lower outlet plate 240 by the connection link 250 and the upper inlet plate 210 connected to the upper outlet plate 230 are moved together. According to various exemplary embodiments of the present invention, the upper outlet plate 230 and the lower outlet plate 240 are configured to always maintain parallel to each other when the slit assembly 200 is rotated by the up and down directions movement of the knob 260. For example, the connection link 250 is formed of a rigid material and is configured to be not rotatable with respect to the upper coupling portion 236 or the lower coupling portion 246 so that the upper outlet plate 230 and the lower outlet plate 240 are configured to always maintain parallel to each other when the slit assembly 200 is rotated. In other words, the outlet slit S2 may always maintain a predetermined distance, regardless of where the knob 260 is located. The air discharged is directed by the upper outlet plate 230 and the lower outlet plate 240 that are maintained parallel to each other. The knob sliding portion 262 may be coupled to the upper outlet plate 230, but the description is omitted to avoid repetition.

The knob 260 is connected to the vanes 270. According to various exemplary embodiments of the present invention, the vanes 270 may be vertical-type. That is, each vane 270 is placed vertically, and the wind may be discharged through between each of the vanes 270. The vanes 270 may change the direction of discharged wind by the left and right directions movement of the knob 260. That is, the vanes 270 are configured to be tiltable to the left and right directions within the outlet slit S2. According to various exemplary embodiments of the present invention, the knob 260 and the vanes 270 are connected to each other by a vane link 280. The vane link 280 connects the knob 260 and the vanes 270 to each other so that the vanes 270 are moved in the same direction of the knob 260 by the left and right directions movement of the knob 260. According to various exemplary embodiments of the present invention, a plurality of connection portions 282 are provided at the vane link 280, and a plurality of vane coupling portions 272 that are coupled to the connection portions 282, respectively, are provided at the vanes 270. Therefore, for example, when the knob 260 is moved to the left direction thereof, the vane link 280 is also moved to the left direction and the vanes 270 face leftward. Conversely, when the knob 260 is moved to the right direction thereof, the vanes 270 face rightward.

The vanes 270 are coupled to a vane spacer 290. The vane spacer 290 is configured to position the vanes 270 at the outlet slit S2 or the air outlet 130 side. The vane spacer 290 may position the vanes 270 in the middle of the outlet slit S2 and allow the vanes 270 to be moved to the left and right directions. According to various exemplary embodiments of the present invention, protrusions 292 protruding outwardly from both side surfaces of the vane spacer 292 may be formed. By inserting the protrusion 292 into the middle hole 254 of the connection link 250, the vanes 270 may be positioned at the outlet slit S2.

The slit assembly 200 is accommodated within the housing 100, and the bezel 300 is mounted on the air inlet 120 side. The bezel 300 includes an opening 310 that substantially has an area which is substantially the same as the cross-sectional area of the outlet slit S2. As described above, the bezel 300 may rotatably and slidably couple the knob pivot portion 264. According to various exemplary embodiments of the present invention, the bezel 300 includes a rotation point 320, and the rotation point 320 is coupled to the knob pivot portion 264 to allow the knob 260 to be rotatable and slidable.

Hereinafter, with reference to FIGS. 5 to 8C, an operation of the air vent assembly 1 according to various exemplary embodiments of the present invention will be described.

Figure 5:
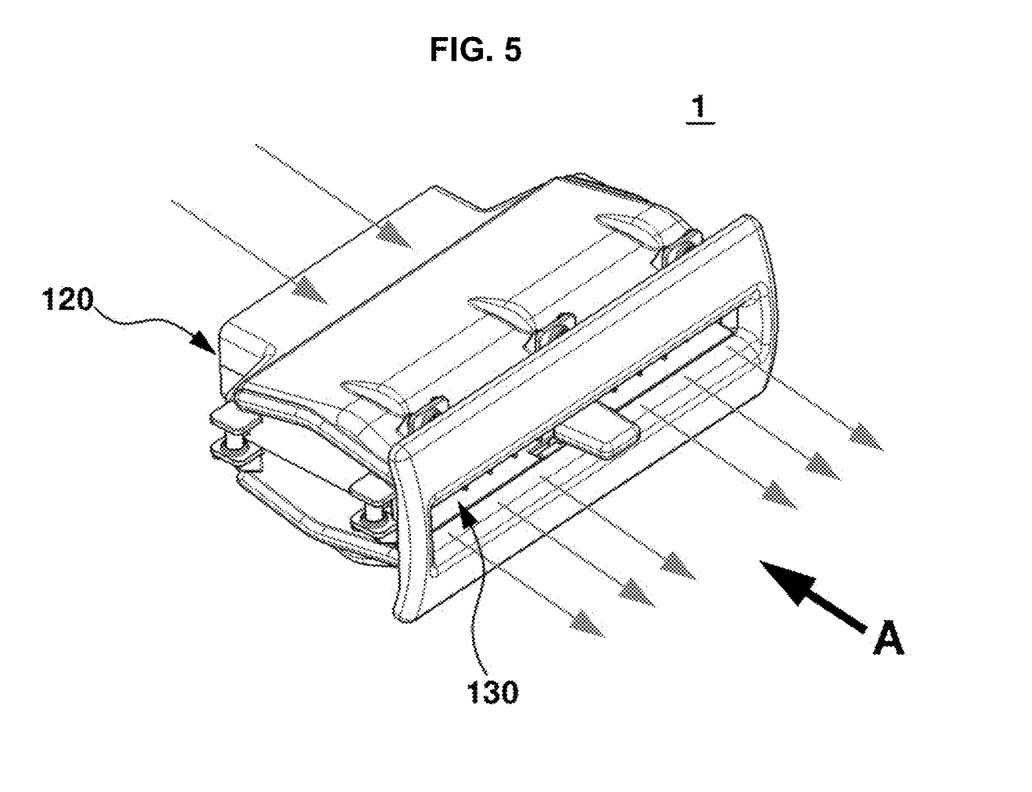
FIG. 5 is a perspective view exemplarily illustrating the air vent assembly according to various exemplary embodiments of the present invention.
Figure 6:
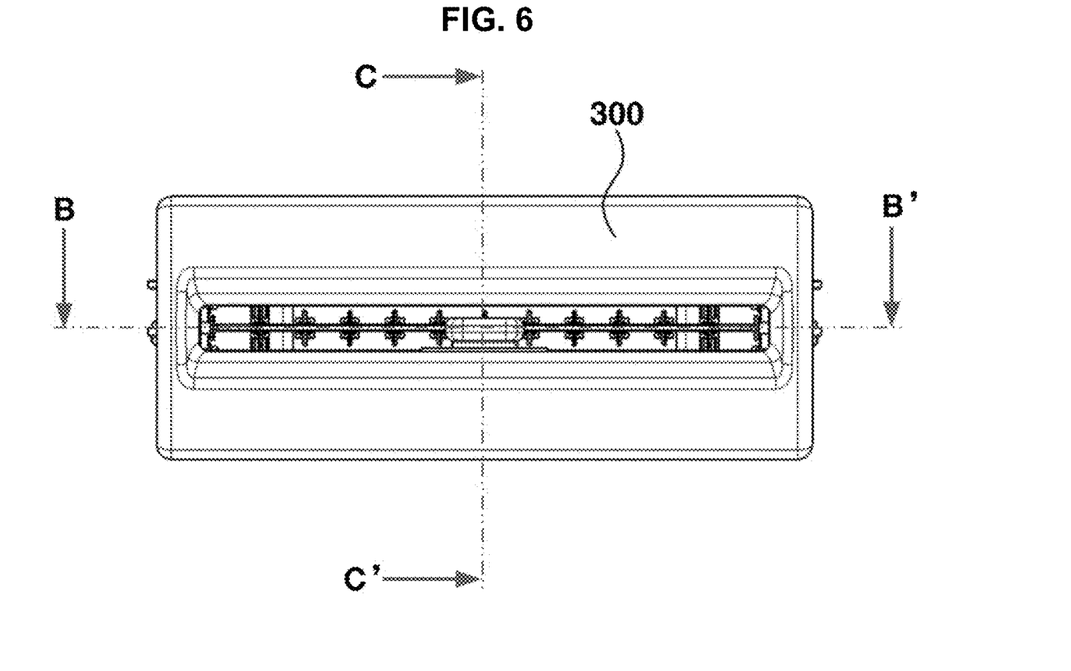
FIG. 6 is a front view exemplarily illustrating the air vent assembly when viewed from a direction A in FIG. 5.
Figure 7A:
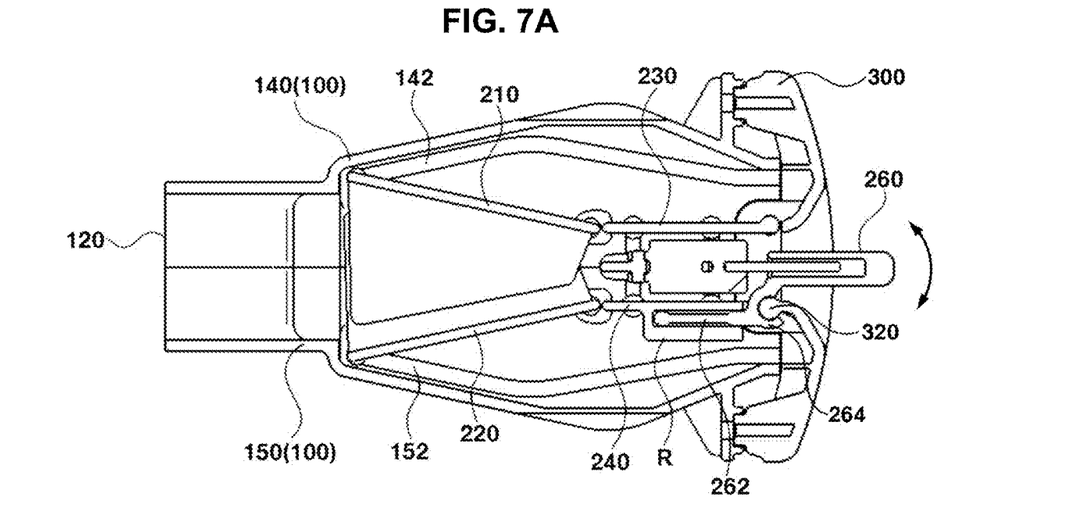
FIG. 7A, FIG. 7B, and FIG. 7C are cross-sectional views taken along line C-C' in FIG. 6.
Figure 7B:
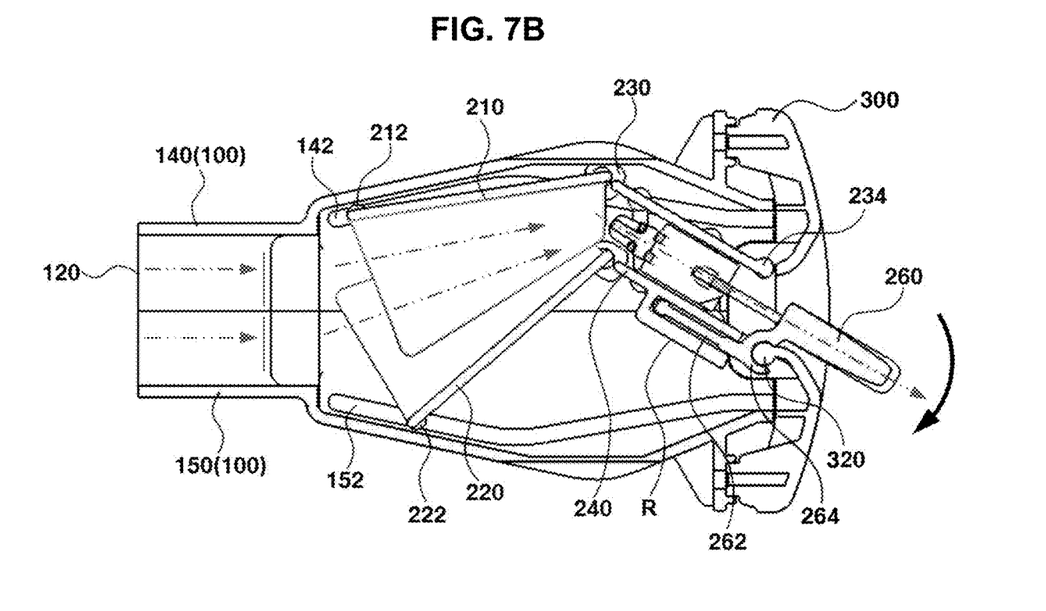
Figure 7C:
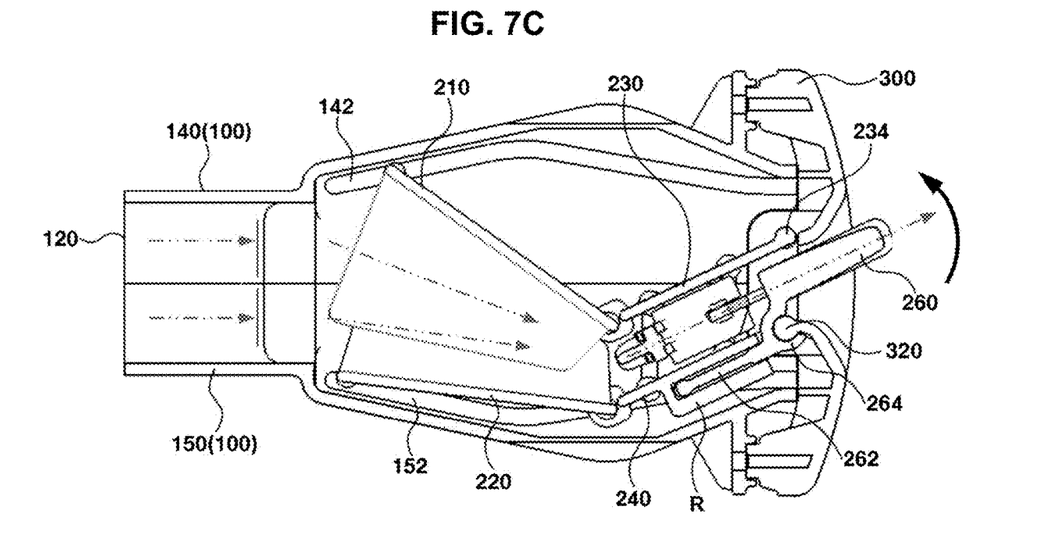
Figure 8B:
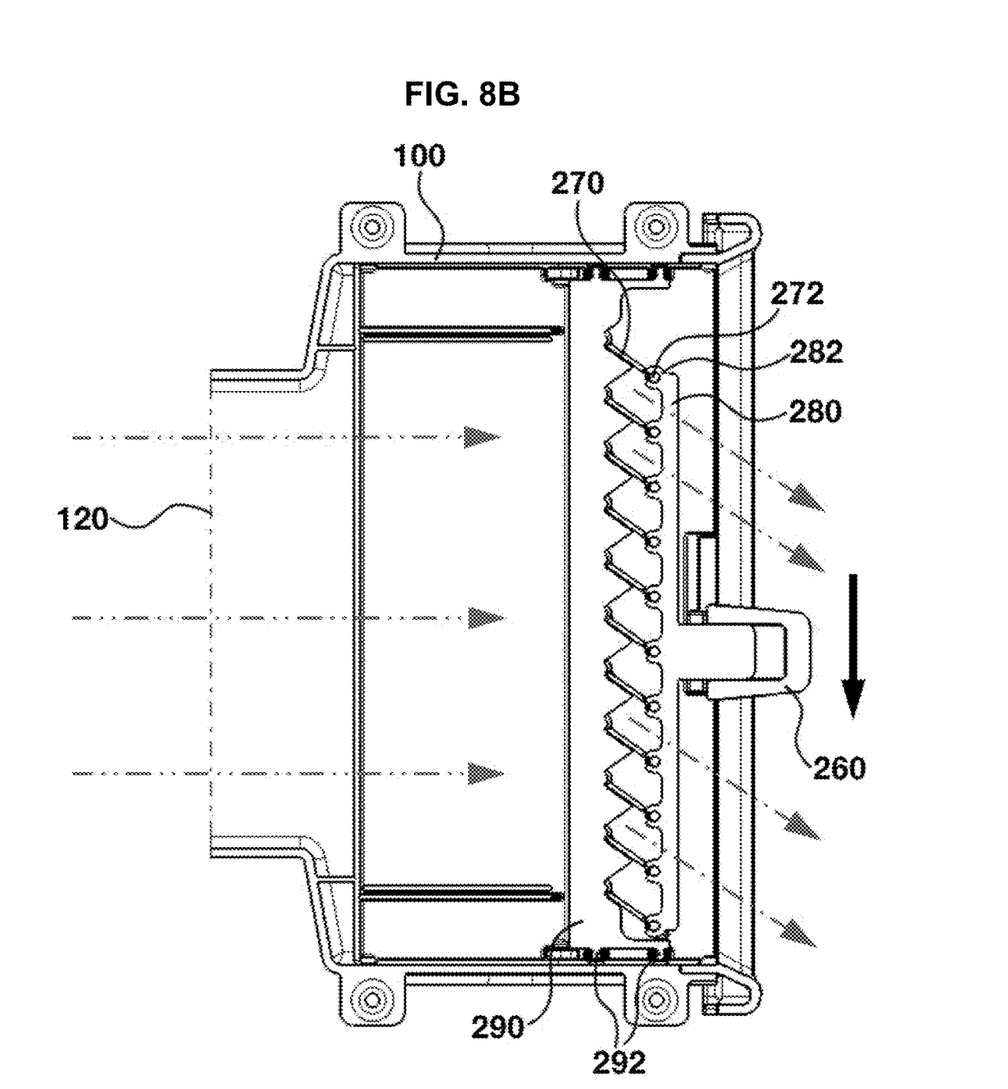
Figure 8C:
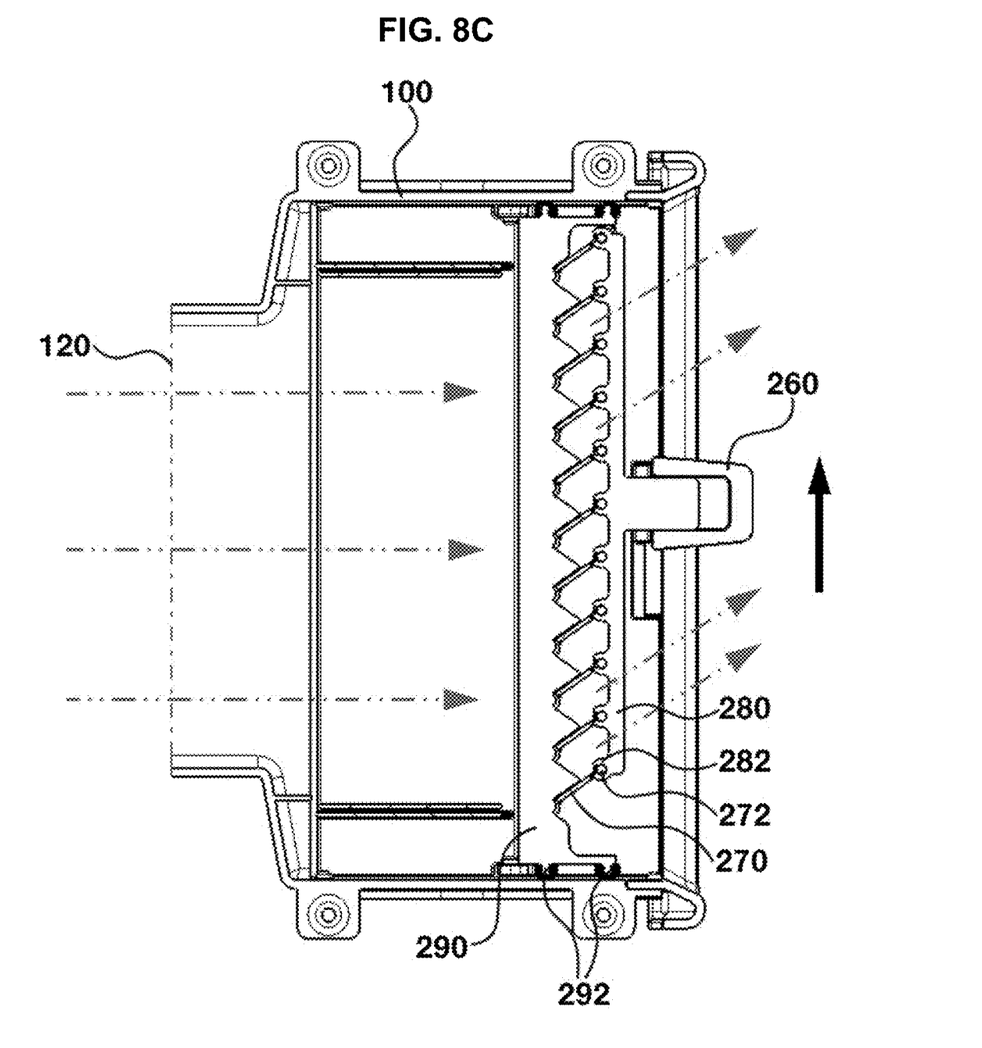

FIG. 5 is a perspective view exemplarily illustrating the air vent assembly according to various exemplary embodiments of the present invention. FIG. 6 is a front view exemplarily illustrating the air vent assembly when viewed from a direction an in FIG. 5. FIG. 7A, FIG. 7B, and FIG. 7C are cross-sectional views taken along line C-C' in FIG. 6, illustrating the up and down directions adjustment of the discharge direction. FIG. 8A, FIG. 8B and FIG. 8C are cross-sectional views taken along line B-B' in FIG. 6, illustrating the left and right directions adjustment of the discharge direction.

FIG. 7A illustrates a standard state in which the knob 260 is not rotated to the up and down directions. As indicated by the arrow, the knob 260 may be rotated to the up and down directions within the opening 310 of the bezel 300. The slit assembly 200 forms the inlet slit S1 and the outlet slit S2 which are connected to each other and forming a flow path where the air flows. When the knob 260 rotates, the upper outlet plate 230 or the lower outlet plate 240 is bent in the up or down direction so that the wind is discharged along the bent direction. The upper outlet plate 230 and the upper inlet plate 210 are rotatably connected to each other, the lower outlet plate 240 and the lower inlet plate 220 are rotatably connected to each other, and each of the upper inlet plate 210 and the lower inlet plate 220 is slidably connected to the housing 100. Hence, the slit assembly 200 is operated in conjunction with the rotation of the knob 260.

FIG. 7B illustrates a state in which the knob 260 is rotated to the lower direction. When the knob 260 is rotated to the lower direction, the upper outlet plate 230 and the lower outlet plate 240 are rotated upward with respect to the upper pivot point 234 and the lower pivot point 244. At the instant time, the upper movement points 214 of the upper inlet plate 210 and the lower moving points 224 of the lower inlet plate 220 that are connected to the upper connection points 232 and the lower connection points 242, respectively, are moved upward, and each of the upper slide points 212 and the lower slide points 222 are slidably moved along the upper tracks 142 and the lower tracks 152, respectively. The air introduced to the air inlet 120 flows through the inlet slit S1 and the outlet slit S2, which are bent with respect to each other, and the air is discharged to the lower direction. At the instant time, as described above, the upper outlet plate 230 and the lower outlet plate 240 are rotated while being maintained parallel to each other.

FIG. 7C illustrates a state in which the knob 260 is rotated upwards. When the knob 260 is rotated upward, the upper outlet plate 230 and the lower outlet plate 240 are rotated to the lower direction with respect to the upper pivot point 234 and the lower pivot point 244. At the instant time, the upper movement points 214 of the upper inlet plate 210 and the lower moving points 224 of the lower inlet plate 220 that are connected to the upper connection points 232 and the lower connection points 242, respectively, are moved to the lower direction. Each of the upper slide point 212 and the lower slide point 222 is slidably moved along the upper tracks 142 and the lower tracks 152, respectively. The air introduced to the air inlet 120 flows through the inlet slit S1 and the outlet slit S2, which are bent with respect to each other, and the air is discharged to the upper direction. Likewise, the upper outlet plate 230 and the lower outlet plate 240 maintained parallel to each other, and an orientation direction of the discharged air is formed through the parallel outlet slit S2.

FIG. 8A illustrates a standard state in which the knob 260 is not rotated to the left and right directions. As indicated by the arrow, the knob 260 is configured to be moved to both the left and right directions.

FIG. 8B illustrates a state in which the knob 260 is moved to the left direction when viewed from the direction A in FIG. 5. By moving the knob 260, which is slidably fastened to the bezel 300 by the knob pivot portion 264, to the left direction, the vanes 270 connected to the knob 260 is rotated to the left direction and the air is discharged to the left direction.

FIG. 8C illustrates a state in which the knob 260 is moved rightward when viewed from the direction A in FIG. 5. By moving the knob 260, which is slidably fastened to the bezel 300, in the right direction, the vanes 270 connected to the vane link 280 by the vane coupling portion 272 is rotated to the right direction and the air is discharged to the right direction.

According to various exemplary embodiments of the present invention, the discharged wind from the slit assembly may be controlled precisely such that the wind is directed in a desired direction.

According to various exemplary embodiments of the present invention, the direction of air discharged from the slit assembly may be easily and accurately adjusted in up and down directions. Previously, a slim air vent was constructed by reducing the number of wings in the up and down directions. However, it was difficult to form a flow path which is for directing a wind direction with a small number of wings. In contrast, the present invention easily enables controlling of the wind direction without disturbing the flow of the wind by forming the flow path with the slit which is not externally exposed even though there are no wings.

Furthermore, previously, to form a passage of wind, an upper flow path and a lower flow path were provided in a housing, and one of the paths are blocked and the other of the paths are opened in accordance with a selected direction of discharge air. A loss of wind speed occurs by a collision against the flow path at the blocked side. Moreover, elaborate control was made difficult as the wind moving upward and the wind moving downward collides with each other during the wind direction heading to the middle. In contrast, according to various exemplary embodiments of the present invention, the above-described problems may be solved by forming a single flow path which is formed of the inlet slit and the outlet slit which the single flow path is configured to be bent to the up and down directions according to a desired discharging direction of the wind by use of the tracks provided in the housing. Therefore, since a flow path is formed in one direction even when an orientation direction is controlled to the middle direction, there is no loss of wind speed occurring by the collision against the flow path, and detailed control of the wind direction is possible.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air vent assembly comprising:
    a housing configured to allow air to pass therethrough;
    a slit assembly disposed inside the housing and configured to control a flow direction of the air;
    a knob movably connected to the slit assembly to move the slit assembly; and
    a bezel coupled to the housing, wherein the knob is directly coupled to the bezel and pivotable with respect to the bezel,
    wherein the slit assembly includes:
        an upper inlet plate slidably connected to the housing so that the upper inlet plate is movable along an internal surface of the housing;
        a lower inlet plate forming an inlet slit from the upper inlet plate and disposed inside the housing, wherein the lower inlet plate is slidably connected to the housing and movable along the internal surface of the housing; and
        an outlet plate, wherein a first side of the outlet plate is pivotally coupled to the upper inlet plate and the lower inlet plate to be movable together with the upper inlet plate and the lower inlet plate and a second side of the outlet plate is pivotally coupled to the housing,
    wherein the knob includes a knob sliding portion inserted into an accommodation portion provided in a bottom side of the outlet plate, and
    wherein the knob sliding portion is slidable in the accommodation portion in a direction traverse to the housing.

2. The air vent assembly of claim 1, wherein an outlet slit being in fluidical communication with the inlet slit is formed within the outlet plate.

3. The air vent assembly of claim 2,
    wherein the air vent assembly further includes a plurality of vanes arranged in vertical directions within the outlet slit and connected to the knob to be tiltable in the direction traverse to the housing.

4. The air vent assembly of claim 3, further including a vane link that couples the knob and the plurality of vanes to each other.

5. The air vent assembly of claim 4,
wherein a first side of the vane link is coupled to the knob, and a second side of the vane link includes a connection portion, and
wherein the plurality of vanes include a vane coupling portion to which the connection portion is coupled.

6. The air vent assembly of claim 5, further including a vane spacer connected to the outlet plate and coupled to the plurality of vanes to be suspended at the outlet slit.

7. The air vent assembly of claim 3, wherein the outlet plate includes:
an upper outlet plate of which a first side is pivotally coupled to the upper inlet plate to move together with the upper inlet plate and of which a second side is pivotably coupled to the housing; and
a lower outlet plate forming an outlet slit from the upper outlet plate and connected to the lower inlet plate, the lower outlet plate having a first side pivotally coupled to the lower inlet plate to move together with the lower inlet plate and a second side is pivotally coupled to the housing, and
wherein end portions of the upper outlet plate and the lower outlet plate are connected by a connection link, and
wherein the plurality of vanes are pivotally coupled to a middle portion of the connection link.

8. The air vent assembly of claim 2, wherein air is configured to flow within the housing through the inlet slit and the outlet slit.

9. The air vent assembly of claim 2, wherein the housing includes:
an air inlet to which the air from an outside is introduced and positioned adjacent to the upper inlet plate and the lower inlet plate; and
an air outlet through which the air passed through the housing is discharged and positioned adjacent to the outlet plate.

10. The air vent assembly of claim 9, wherein the bezel is coupled to the air outlet and includes an opening which is in fluidical communication with the outlet slit.

11. The air vent assembly of claim 1, wherein the outlet plate includes:
an upper outlet plate of which a first side is pivotally coupled to the upper inlet plate to move together with the upper inlet plate and of which a second side is pivotably coupled to the housing; and
a lower outlet plate forming an outlet slit from the upper outlet plate and connected to the lower inlet plate, the lower outlet plate having a first side pivotally coupled to the lower inlet plate to move together with the lower inlet plate and a second side pivotably coupled to the housing.

12. The air vent assembly of claim 11, wherein the housing includes:
upper tracks formed on the internal surface of the housing, wherein upper slide points of the upper inlet plate are slidably coupled to the upper tracks; and
lower tracks formed on the internal surface of the housing, wherein lower slide points of the lower inlet plate are slidably connected to the lower tracks.

13. The air vent assembly of claim 12,
wherein the upper inlet plate includes upper movement points that are provided at a position spaced from each of the upper slide points with a predetermined distance and rotatably connected to upper connection points of the upper outlet plate, and
wherein the lower inlet plate includes lower moving points that are provided at a position spaced from each of the lower slide points with a predetermined distance and rotatably connected to lower connection points of the lower outlet plate.

14. The air vent assembly of claim 13,
wherein the upper outlet plate includes upper pivot points formed at a position spaced from each of the upper connection point with a predetermined distance and pivotably coupled in the housing, and
wherein the lower outlet plate includes lower pivot points formed at a position spaced from each of the lower connection point with a predetermined distance and pivotably coupled in the housing.

15. The air vent assembly of claim 11,
wherein the upper outlet plate is configured to be movable in up and down directions within the housing together with the upper inlet plate, and is configured to be rotatable with respect to the upper inlet plate, and
wherein the lower outlet plate is configured to be movable in up and down directions within the housing together with the lower inlet plate, and is configured to be rotatable with respect to the lower inlet plate.

16. The air vent assembly of claim 15, wherein the bezel is coupled to the housing at a side of the outlet slit to fluidically communicate with the outlet slit, wherein the knob is rotatably and slidably coupled to the bezel.

17. The air vent assembly of claim 11, wherein the upper outlet plate and the lower outlet plate are maintained parallel to each other.

18. The air vent assembly of claim 17, further including a connection link that connects the upper outlet plate and the lower outlet plate to each other.

19. The air vent assembly of claim 11, further including:
an upper partition protruding from the upper inlet plate toward the lower inlet plate; and
a lower partition protruding from the lower inlet plate toward the upper inlet plate,
wherein the upper partition and the lower partition overlap with each other so that flow of air in a lateral direction of the inlet slit is prevented.

* * * * *